United States Patent [19]

Strul et al.

[11] Patent Number: 5,337,144

[45] Date of Patent: Aug. 9, 1994

[54] ETCH RATE MONITOR USING COLLIMATED LIGHT AND METHOD OF USING SAME

[75] Inventors: Bruno Strul, Palo Alto; Richard de Geus, Cupertino; Peter Ebbing, Los Altos, all of Calif.

[73] Assignee: Applied Materials, Inc., Santa Clara, Calif.

[21] Appl. No.: 880,464

[22] Filed: May 5, 1992

Related U.S. Application Data

[63] Continuation of Ser. No. 794,324, Nov. 12, 1991, abandoned, which is a continuation of Ser. No. 540,660, Jun. 19, 1990, abandoned.

[51] Int. Cl.⁵ .................................................. G01B 9/02
[52] U.S. Cl. ..................................... 356/357; 356/355
[58] Field of Search ............... 356/355, 356, 357, 359, 356/360

[56] References Cited

U.S. PATENT DOCUMENTS

| | | | |
|---|---|---|---|
| 4,131,365 | 12/1978 | Pryor | 356/356 |
| 4,615,620 | 10/1986 | Noguchi et al. | 356/355 |
| 4,704,033 | 11/1987 | Fay et al. | 356/354 |
| 4,873,430 | 10/1989 | Juliana et al. | |
| 4,927,485 | 5/1990 | Cheng et al. | 356/355 |

FOREIGN PATENT DOCUMENTS 60-173837 1/1986 Japan .
61-241923 3/1987 Japan .

*Primary Examiner*—Samuel A. Turner
*Attorney, Agent, or Firm*—Birgit E. Morris

[57] ABSTRACT

An etch rate monitor for use with semiconductor wafer etching processes includes a source of light of normal incidence to the wafer surface through a window in the etching chamber. In a first embodiment, a Fresnel or positive lens is used to collect some of the diffraction orders caused by the repetitive patterns on the wafer surface which merge from the window. In alternate embodiments, a concave spherical mirror and/or a photodetector system are used to collect the diffraction orders. A collimating lens applies these diffraction orders of normal incidence to interference filters which reject plasma and ambient light and pass the diffraction orders to a photodetector to monitor etch rate as a function of the cycle period between interference minima or maxima caused by the difference in path length between the etched and not etched surfaces of the wafer.

19 Claims, 3 Drawing Sheets

ETCH RATE MONITOR USING COLLIMATED LIGHT AND METHOD OF USING SAME

This is a continuation of U.S. application Ser. No. 07/794,324 filed Nov. 12, 1991, now abandoned, which is a continuation of U.S. application Ser. No. 07/540,660 filed Jun. 19, 1990 now abandoned.

BACKGROUND OF THE INVENTION

1. Field of the Invention

This invention relates to techniques for monitoring etch rate on semiconductor or other wafers during processing in an etch chamber.

2. Description of the Prior Art

Conventional approaches to etch rate monitoring for semiconductor wafers during processing illuminate the repetitive patterns on the wafers through windows into the etch chambers and use photodetector devices to monitor changes in diffraction patterns from repetitive features. Such conventional devices are extremely pattern dependent and therefore relatively complicated to setup, maintain and use. Such conventional devices are quite sensitive to alignment, do not provide satisfactory penetration deep into small features and have poor signal to noise ratio because only a few diffraction orders are collected and processed.

SUMMARY OF THE INVENTION

The preceding and other shortcomings of the prior art are addressed and overcome by the present invention that provides an etch rate monitor for wafer processing having means for applying a collimated light beam of normal incidence to the surface of a masked wafer in an etch chamber, means for collecting light diffracted therefrom, and means for monitoring the etch rate in the chamber in accordance with the time varying intensity of the collected light.

In another aspect, the present invention provides a method for monitoring etch rate during wafer processing by applying a collimated light beam of normal incidence to the surface of a masked wafer being processed, collecting light diffracted therefrom and monitoring the etch rate in accordance with the time varying intensity of the collected light.

These and other features and advantages of this invention will become further apparent from the detailed description that follows which is accompanied by a set of drawing figures. In the figures and description, numerals indicate the various features of the invention, like numerals referring to like features throughout both the drawings and the description.

DETAILED DESCRIPTION OF THE PREFERRED EMBODIMENT(S)

Figure 1:
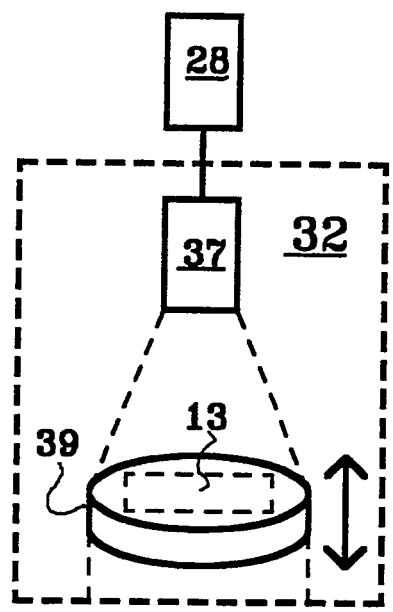
FIG. 1 is an illustration of a portion of an etch chamber and an etch rate monitor associated therewith in accordance with the present invention in which a lens system is used for collecting diffraction orders.
Figure 1:
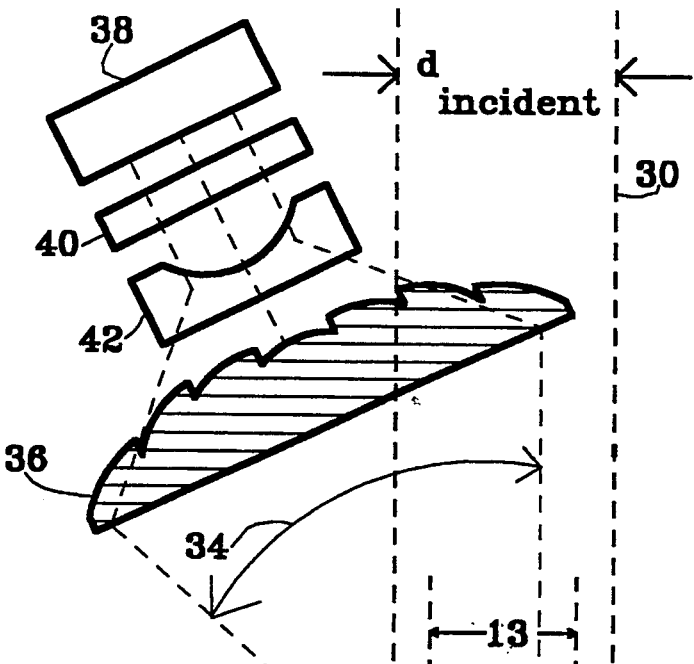
Figure 1:
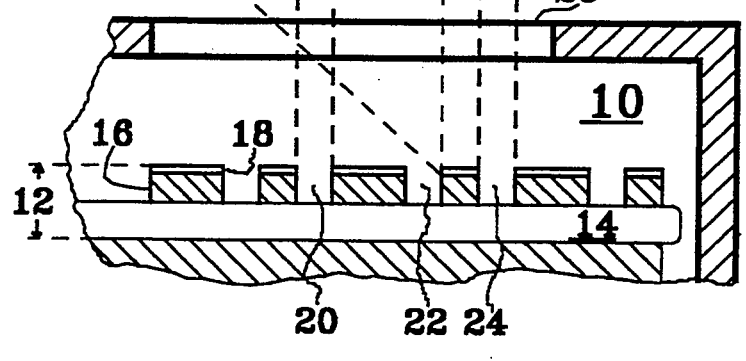

FIG. 1 is an illustration of a portion of etch chamber 10 including semiconductor wafer 12. There are many etching processes in which different materials are etched or protected by resist or mask or resist-mask, but the following description will serve as a common example thereof in order to properly describe the present invention.

Semiconductor wafer 12 is formed of silicon crystal base 14 on which is grown a layer of material, such as silicon dioxide 16, to be etched during processing in etch chamber 10. A pattern of etch resistant material, such as resist pattern 18, is formed in a desired, repetitive masking pattern on a layer to be etched, such as silicon dioxide layer 16. The repetitions of the masking pattern represent portions of semiconductor wafer 12 to be separated in a subsequent process into separate semiconductor dies, such as die 13. During operation of etch chamber 10, an etching process, not shown, is used to etch away and remove portions of silicon dioxide layer 16, such as portions 20, 22 and 24, which are not protected by resist pattern 18. The system can also be used for monitoring the etch rate of other wafer processes including single crystal and recessed polysilicon processes.

An important operating consideration during this etching process is the depth of the etch. Although great care and planning goes into attempting to predetermine the total etching depth required to remove exactly the amount of material desired to be removed, it is still very important to actually monitor the depth of the etch to stop the etching process at the proper time for the wafer being processed to provide a good yield of properly etched wafers.

Etch chamber 10 includes window 26 through which the etching processes may be viewed. In accordance with the present invention, light source 28 provides incident collimated light beam 30 whose diameter, $d_{incident}$, is preferably slightly larger than the largest dimension of die 13. If, for example, die 13 is a rectangular die, $d_{incident}$ should be only slightly larger than the diagonal dimension of die 13 in order not to compete with the collection of the diffraction orders emerging from window 26.

That is, as $d_{incident}$ is increased in diameter, the opening, not shown, through collection optics 36 through which $d_{incident}$ must pass must be increased. This results in a reduction of the useful area of collection optics 36 and therefore a reduction in the diffraction orders which may be collected thereby.

Light source 28, and associated light source optics 32, are mounted with respect to etch chamber 10 so that collimated light beam 30 passes through the opening in collection optics 36 discussed above and is of normal incidence to the surface of semiconductor wafer 12. Incident collimated light beam 30 preferably enters window 26 close to its perimeter in order to maximize the collection of diffraction orders.

Light source optics 32 includes stressed fiber beam homogenizer 37 positioned between light source 28, which may conveniently be an optical laser, and variable focal length collimating lens 39 so that the light in incident collimated light beam 30 may be made as uniform as possible. The diameter of incident collimated light beam 30 may be adjusted by moving variable focal length collimating lens 39 with respect to stressed fiber beam homogenizer 37.

Repetitive resist pattern 18 serves as a diffraction grating and reflects many diffraction orders as a result of incident collimated light beam 30. Many diffraction orders emerge from window 26. Several such diffraction orders emerge through window 26 along reflection path 34 to collection optics 36 as will be discussed below with reference to FIG. 2. Semi-conductor wafer 12 should be positioned as close as possible to window 26 to allow at least one quadrant of the diffraction orders to emerge from window 26.

Figure 3:
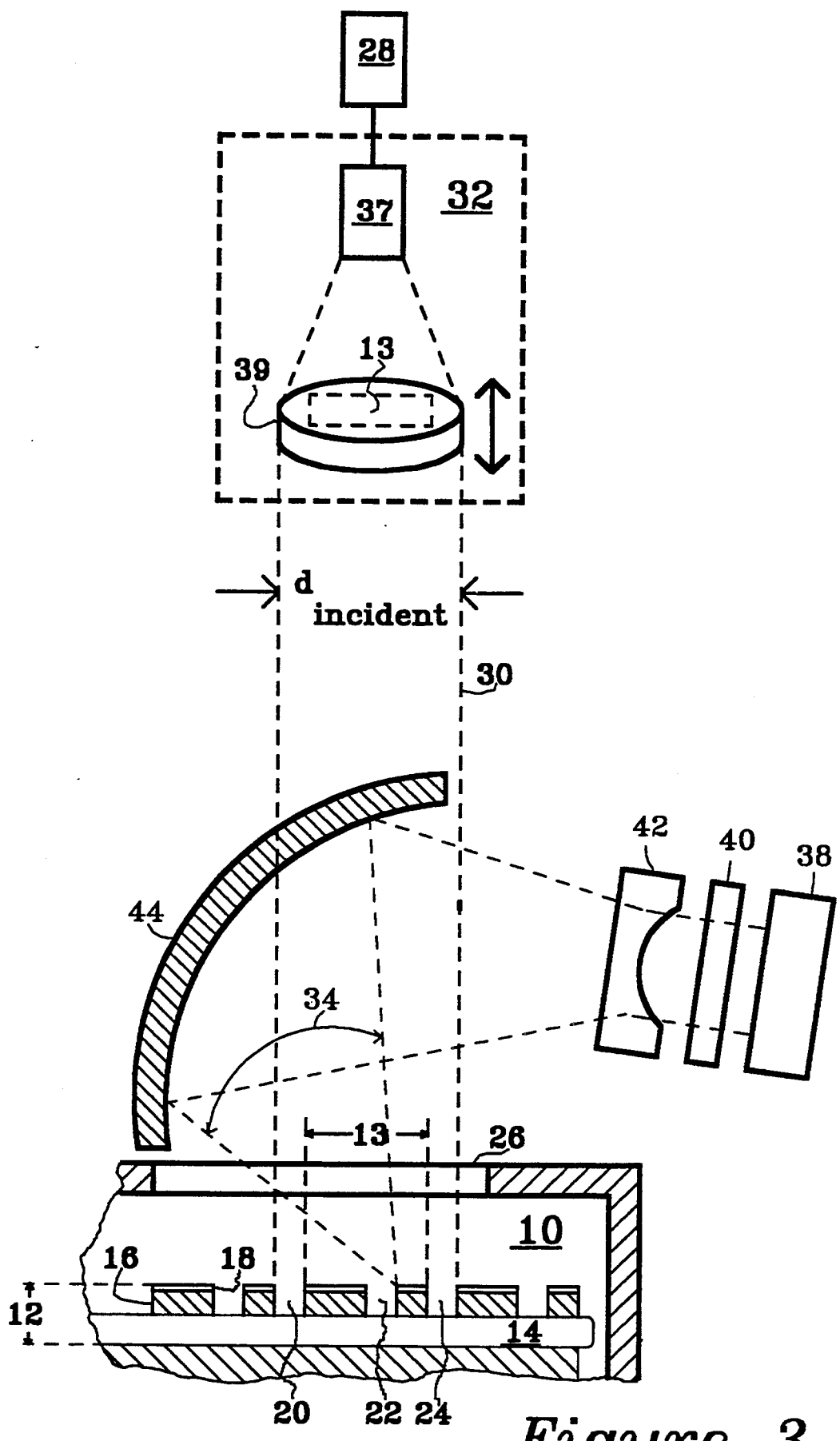
FIG. 3 is an illustration of another embodiment of the present invention in which a concave mirror is used for collecting diffraction orders.
Figure 4:
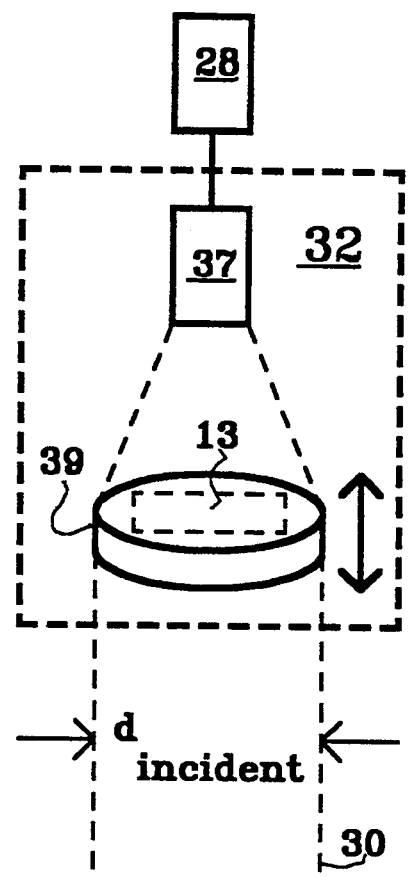
FIG. 4 is an illustration of another embodiment of the present invention in which a photodetector is used directly for collecting diffraction orders.
Figure 4:
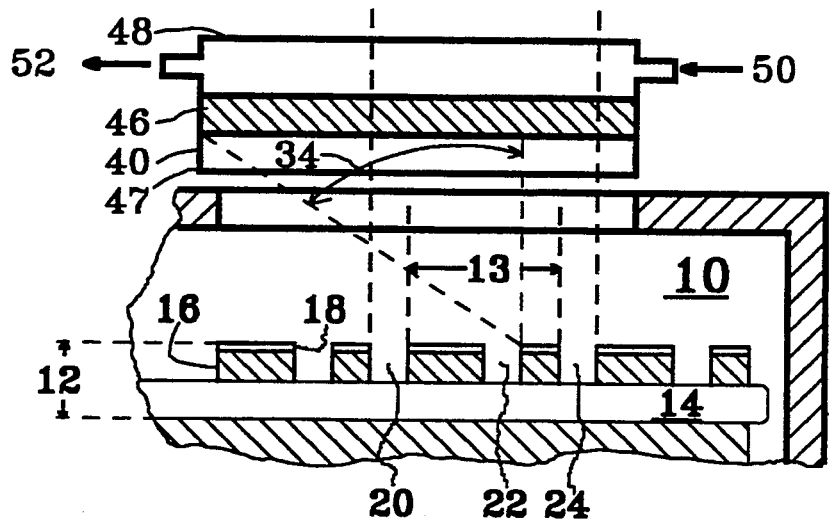

Collection optics 36 is a large diameter, short focal length lens, such as a Fresnel lens or a positive lens, not shown, in order to collect as many diffraction orders as possible. The positive lens would provide better quality diffracted light to detector 38 than a Fresnel lens which tends to scatter light because of its construction. The positive lens however, would have to be very thick and therefore both heavy and cumbersome. In addition, the very thickness of the lens would result in partial attenuation of absorbed light. The Fresnel lens is thinner and easier to work with, but the resultant light scattering may not be acceptable for some applications. Alternate embodiments are shown in FIGS. 3 and 4, below, which reduce these problems.

Collection optics 36 includes a hole or other opening for permitting incident collimated light beam 30 to reach semiconductor wafer 12 without obstruction. Collection optics 36 serves to redirect diffraction orders emerging along reflection path 34 to detector 38, positioned along the optical axis of collection optics 36. Detector 38 may be conventional photodetection apparatus and is used, with electronic systems not shown, for monitoring etch rate in etch chamber 10.

During operation, the etch rate, R, may be determined by monitoring the intensity of the collected portion of the light diffracted by resist pattern 18. This intensity varies in a repeating pattern as a function of etching depth. As will be discussed in greater detail below with reference to FIG. 2, the light intensity varies from a maxima to a minima every time the depth of the etch, called feature depth d, increases by one half wavelength of incident light.

Figure 2:
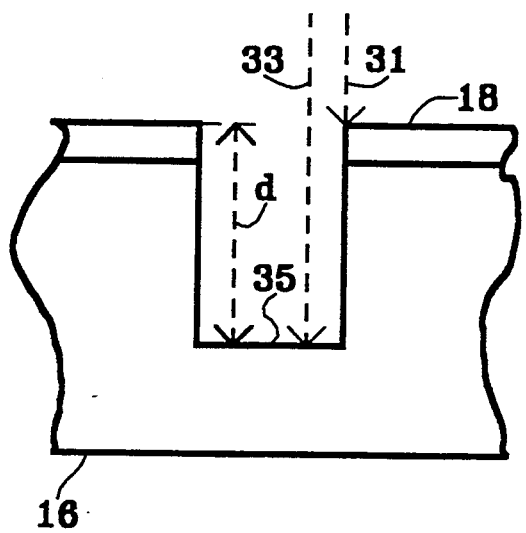
FIG. 2 is an illustration of a portion to be etched of the semiconductor wafer shown in FIG. 1.

With reference now to FIG. 2, collimated light beam 30 is of normal incidence to resist pattern 18. The etching process causes etched surface 35 of silicon dioxide layer 16, to be etched away and recede further and further below the surface of resist pattern 18. Etching therefore increases the length of the path from light source 28 to etched surface 35, represented by ray 33. The path length of light source 28 to pattern 18 is represented by ray 31 and will not change as a result of the etching process. The length of ray 33 will therefore exceed the length of ray 31 by feature depth d.

When the path length difference between ray 31 and ray 33 is equal to odd multiples of half the wavelength of incident collimated light beam 30, these rays will reach detector 38 180° out of phase with each other and destructively interfere. Destructive interference results in a detectable reduction of intensity as monitored by detector 38. When the path length difference between ray 31 and ray 33 is equal to even multiples of half the wavelength of incident collimated light beam 30, these rays will reach detector 38 exactly in phase with each other and constructively interfere. Constructive interference results in a detectably greater light intensity than destructive interference as monitored by detector 38.

The intensity monitored by detector 38 therefore exhibits maxima and minima resulting from constructive and destructive interference every time feature depth d changes by $\Delta d$, an amount of etch depth equal to one half wavelength of the incident light, $\lambda$, as follows:

$$\Delta d = \lambda/2.$$

Etch rate R is the rate of change of feature depth d as a function of time and may be determined by monitoring cycle period T, the time between occurrences of light intensity maxima or minima, as determined by detector 38. Each cycle period T represents a change of depth equal to one half wavelength of incident collimated light beam 30. It may be convenient, for example, to monitor the cycle period T between light intensity minima. Etch rate R may then be determined from the wavelength of incident collimated light beam 30 and cycle period T, as follows:

$$R = \Delta d/T = \lambda/2T.$$

Improvements in the accuracy of the etch rate monitoring information determined by detector 38 can be achieved by the inclusion of interference filter 40 between collection optics 36 and detector 38 to reject plasma light, ambient light and other sources of light which add noise and reduce monitoring accuracy. Interference filter 40 requires the light beam to be of normal incidence. For this purpose, collimating lens 42 is placed between collection optics 36 and interference filter 40. Collimating lens 42 may conveniently be a plano-concave lens with a negative focal point.

In addition, it is desirable to select light source 28 so that the smallest convenient wavelength light may be used in order to most easily monitor the smallest possible change in feature depth.

FIG. 3 is an illustration of an etch rate monitor in accordance with the present invention in which reflective optical system, such as concave spherical mirror 44, is used in lieu of collection optics 36, shown in FIG. 1, to converge the diffracted light from semiconductor wafer 12 onto collimating lens 42, interference filters 40 and detector 38. Concave mirror 44 is provided with an opening, not shown, which permits unobstructed passage of incident collimated light beam 30 from light source optics 32 through window 26 to semiconductor wafer 12. Spherical concave mirror 44 provides the same quality of light collection as a positive lens used as collection optics 36 as shown in FIG. 1 and substantially superior quality of light collection than a Fresnel lens would under the same circumstances.

In addition, concave mirror 44 does not have the attenuation and losses associated with a very thick positive lens, nor the weight. Because concave mirror 44 permits the diffraction orders to be redirected by reflection to collimating lens 42, interference filters 40 and detector 38, these devices may be mounted closer to etch chamber 10 making the resultant device more compact and enclosable.

FIG. 4 is an illustration of still another embodiment of an etch rate monitor in accordance with the present invention in which photodetector 46 is used in lieu of collection optics 36, shown in FIG. 1, or concave mirror 44, shown in FIG. 3, to collect and detect the diffracted light from semiconductor wafer 12. Interference filters 40 may conveniently be positioned between photodetector 46 and window 26.

Heat transfer requirements for photodetector 46 and/or etch chamber 10 may be conveniently handled by positioning heat exchanger 48 on the surface of photodetector 46 opposite interference filters 40. Heat exchanger 48 may be a liquid cooled heat exchanger ensuring consistent performance of photodetector 46 and be provided with coolant in flow port 50 and out flow port 52.

Photodetector 46, and heat exchanger 48, must be provided with an opening, not shown, which permits unobstructed passage of incident collimated light beam 30 from light source optics 32 through window 26 to semiconductor wafer 12. Interference filters 40 permit passage of light with the wavelengths in incident collimated light beam 30 and reject light with wavelengths different therefrom so that an opening within interference filters 40 for passage of incident collimated light beam 30 is not required.

Photodetector 46 may be a single photodetector or an array of such photodetectors, depending upon the application. The advantages of photodetector 46 over concave mirror 44 shown in FIG. 2 or collection optics 36 shown in FIG. 1 are simplicity, compactness and convenience. In order to improve the diffraction order collection capability of photodetector 46, it may be desirable to mount photodetector 46 at some predetermined angle, rotated about an axis such as axis 47, so that diffraction orders may be detected more normal to the surface of photodetector 46.

While this invention has been described with reference to its presently preferred embodiment, its scope is not limited thereto. Rather, such scope is only limited insofar as defined by the following set of claims and includes all equivalents thereof.

We claim as our invention:

1. An etch rate monitor for monitoring the etch rate of a substrate being etched in an etch chamber comprising
    a) a light transmissive window in said etch chamber;
    b) means for applying a collimated light beam through said window near the periphery thereof to said substrate at a normal angle of incidence to the surface of the substrate being etched;
    c) means for collecting reflected light having multiple diffraction orders of time varying intensity through said window at a substantial angle to the path of said collimated light;
    d) a photodetector, for said reflected light; and
    e) means coupled to said photodetector and responsive to the time varying intensity of the collected light for monitoring etch rate in said chamber.

2. The etch rate monitor claimed in claim 1 wherein the means for collecting light further comprises:
    means for directing light diffracted from said wafer surface towards said photodetector means.

3. The etch rate monitor claimed in claim 2 wherein said means for directing light comprises:
    transmissive lens means.

4. The etch rate monitor claimed in claim 2 wherein the means for directing light comprises:
    curved mirror means.

5. The etch rate monitor claimed in claim 1 wherein the means for collecting light further comprises:
    a heat exchanger associated with the photodetector means.

6. The etch rate monitor claimed in claim 2 wherein the means for collecting reflected light comprises:
    an interference filter; and
    a collimating lens for applying light from the means for directing light to the interference filter.

7. The etch rate monitor claimed in claim 1 wherein the means coupled to the photodetector means determines the cycle period between intensity minima.

8. The etch rate monitor claimed in claim 1 wherein the means coupled to the photodetector means determines the cycle period between intensity maxima.

9. The etch rate monitor claimed in claim 1 wherein the means coupled to the photodetector means determines etch rate as a function of a wavelength of the collimated light beam of normal incidence and a cycle period between interference patterns of the diffracted light.

10. A method of monitoring etch rate during semiconductor substrate processing comprising the steps of:
    a) applying a collimated light beam of normal incidence through a light transmissive window provided in an etch chamber proximate to an edge of said window to the surface of a substrate being processed;
    b) collecting diffracted light having multiple diffraction orders of time varying intensity therefrom and then detecting the intensity of the diffracted light; and
    c) detecting changes in the diffracted light intensity to monitor etch rate in the chamber.

11. The method of monitoring etch rate claimed in claim 10, wherein the step of collecting diffracted light further comprises:
    concentrating said diffracted light prior to detecting its intensity.

12. The method of monitoring etch rate claimed in claim 11, wherein said step of concentrating said diffracted light uses a transmissive lens.

13. The method of monitoring etch rate claimed in claim 11, wherein the step of concentrating said diffracted light uses a reflective optical system.

14. The method of monitoring etch rate claimed in claim 10 wherein the step of collecting diffracted light uses a photodetector.

15. The etch rate monitor claimed in claim 14 wherein the step of collecting diffracted light further includes:
    associating a heat exchanger with the photodetector.

16. The method of monitoring etch rate claimed in claim 11 wherein the step of concentrating said diffracted light further comprises:
    collimating the diffracted light to produce a collimated, diffracted light; and
    applying the collimated, diffracted light to an interference filter.

17. The method of monitoring etch rate claimed in claim 10 wherein the detecting changes step further comprises the step of;
    determining a cycle period between intensity minima.

18. The method of monitoring etch rate claimed in claim 10 wherein the detecting changes step further comprises the step of;
    determining a cycle period between intensity maxima.

19. The method of monitoring etch rate in claim 10 wherein the detecting changes step further comprises the step of:
    determining the etch rate as a function of a wavelength of the collimated light of normal incidence and the cycle period between interference patterns of the diffracted light.

* * * * *